United States Patent
Longet et al.

(10) Patent No.: US 10,642,230 B2
(45) Date of Patent: May 5, 2020

(54) MANAGEMENT METHOD FOR MANAGING INSTALLATION INCLUDING POWER SUPPLY DEVICE, COMPUTER PROGRAM PRODUCT, INFORMATION MEDIUM, AND ASSOCIATED MANAGEMENT SYSTEM

(71) Applicant: PARKEON, Paris (FR)

(72) Inventors: Christian Longet, Amagney (FR); Michel Thiebaut, Ornans (FR)

(73) Assignee: FLOWBIRD, Paris (FR)

( * ) Notice: Subject to any disclaimer, the term of this patent is extended or adjusted under 35 U.S.C. 154(b) by 220 days.

(21) Appl. No.: 15/223,272

(22) Filed: Jul. 29, 2016

(65) Prior Publication Data
US 2017/0075321 A1    Mar. 16, 2017

(30) Foreign Application Priority Data
Jul. 30, 2015    (FR) .................... 15 57296

(51) Int. Cl.
| | | |
|---|---|---|
| G05B 13/02 | (2006.01) |
| G06Q 10/06 | (2012.01) |
| G06Q 50/06 | (2012.01) |
| G01C 11/02 | (2006.01) |
| H02J 3/38 | (2006.01) |

(52) U.S. Cl.
CPC ............ *G05B 13/021* (2013.01); *G01C 11/02* (2013.01); *G06Q 10/0631* (2013.01); *G06Q 50/06* (2013.01); *H02J 3/383* (2013.01); *Y02P 90/82* (2015.11)

(58) Field of Classification Search
CPC .. G05B 13/021; G06Q 10/0631; G06Q 50/06; H02J 3/383

USPC .................................................. 700/286, 287
See application file for complete search history.

(56) References Cited

U.S. PATENT DOCUMENTS

| | | | |
|---|---|---|---|
| 7,406,364 B2* | 7/2008 | Andren ................. | G06Q 10/06 700/12 |
| 7,873,442 B2* | 1/2011 | Tsui ...................... | H02J 3/008 700/291 |
| 2010/0145534 A1* | 6/2010 | Forbes, Jr. ............ | G06Q 10/00 700/291 |
| 2011/0137591 A1 | 6/2011 | Ishibashi | |
| 2011/0153108 A1* | 6/2011 | Yoon .................... | G06Q 50/06 700/295 |
| 2014/0012429 A1* | 1/2014 | Dempster ............. | G05F 5/00 700/295 |
| 2014/0032178 A1 | 1/2014 | Kicinski et al. | |
| 2014/0214219 A1 | 7/2014 | Katayama et al. | |

(Continued)

OTHER PUBLICATIONS

French Search Report, dated Jun. 1, 2016, from corresponding French Application.

*Primary Examiner* — Chun Cao
(74) *Attorney, Agent, or Firm* — Young & Thompson

(57) ABSTRACT

A method for managing an installation (10), the installation (10) including: a power supply device (14), and members (16) supplied with energy by the power supply device (14), the method including the following steps:
 determining the available energy coming from the power supply device (14),
 determining the energy consumed by the members (16), and
 optimizing the operation of the installation (10) so that a criterion is met, the criterion being met at least if the energy balance of the installation (10) is positive for a given length of time.

14 Claims, 1 Drawing Sheet

(56) References Cited

U.S. PATENT DOCUMENTS

| | | | | |
|---|---|---|---|---|
| 2014/0297051 A1* | 10/2014 | Zhang | ............... | G05B 15/02 |
| | | | | 700/287 |
| 2015/0019036 A1* | 1/2015 | Murayama | ......... | H02J 13/0006 |
| | | | | 700/291 |
| 2015/0105931 A1* | 4/2015 | Forbes, Jr. | ............ | G06F 1/266 |
| | | | | 700/297 |
| 2017/0278199 A1* | 9/2017 | Wu | ........................ | H02J 3/46 |

\* cited by examiner

MANAGEMENT METHOD FOR MANAGING INSTALLATION INCLUDING POWER SUPPLY DEVICE, COMPUTER PROGRAM PRODUCT, INFORMATION MEDIUM, AND ASSOCIATED MANAGEMENT SYSTEM

BACKGROUND OF THE INVENTION

Field of the Invention

The present invention relates to a management method. The present invention in particular applies to a computer program product, an information medium and a management system.

In general, the invention falls within the field of installations including at least one photovoltaic element. For such installations, in particular for the sizing of the photovoltaic element(s), it is appropriate to have tools capable of providing an estimate of the solar energy produced by such photovoltaic elements.

Description of the Related Art

It is known that some tools intended for the dimensioning of photovoltaic elements use image captures to estimate the sunshine available to the installation. Such tools are in particular used in photovoltaic fleets or structures integrated into a building.

However, none of the aforementioned tools provide an estimate of the solar energy production of the overall system or an estimate of its autonomy.

Other tools take account of data relative to the energy consumption of the installation.

However, such data is a fixed input data. Furthermore, in such tools, the accessible sunshine should be obtained by another application. This may be detrimental in real-time use.

Also known are professional tools, like the ARCHELIOS software (registered trademark), providing a complete analysis for residential installations or production plants.

However, the implementation of the analysis implies taking account of many parameters that make the use of such tools more complex.

There is therefore a need for a management method making it possible to adjust the energy consumption of an installation to improve the service rendered.

BRIEF SUMMARY OF THE INVENTION

To that end, proposed is a management method for an installation, the installation comprising a power supply device, members supplied with energy by the power supply device. The method includes the following steps: determining the available energy coming from the power supply device, determining the energy consumed by the members, and optimizing the operation of the installation so that a criterion is met, the criterion being met at least if the energy balance of the installation is positive for a given length of time.

Owing to these arrangements, the management method provides management of the operation of the installation, i.e., management of the activation or non-activation of certain members based on the energy balance. Such an adjustment makes it possible both to ensure that the members of the installation are always supplied with power and that the service produced by the installation for the user meets the user's actual needs.

According to specific embodiments, the management method includes one or more of the following features, considered alone or according to any technically possible combinations:

the installation is an automaton.

the step for determining the available energy coming from the power supply device includes a sub-step for providing the image of the environment of at least part of the installation, processing the supplied image, computing the energy produced by the power supply device, determining the energy stored by the power supply device, and computing the available energy coming from the power supply device by obtaining the sum of the energy produced by the power supply device and the energy stored by the power supply device.

the step for determining the consumed energy, the consumed energy is expressed in terms of operations.

the method comprises a step for choosing parameters taken into account to determine the energy produced by the power supply device.

the number of parameters taken into account is less than or equal to 7.

the parameters taken into account comprise the geometry of the power supply device, the output of the power supply device and the sunshine produced by the sun.

The invention also relates to a computer program product including a readable information medium, on which a computer program is stored comprising program instructions, the computer program being able to be loaded on a data processing unit and suitable for driving the implementation of a method as previously described when the computer program is implemented on the data processing unit.

Furthermore, also proposed is a data medium including the instructions for the computer program product as previously described.

Furthermore, also proposed in the present application is a management system able to manage the operation of an installation comprising a power supply device, and members supplied with energy by the power supply device. The management system is able to determine the available energy coming from the power supply device, determine the energy consumed by the members, and optimize the operation of the installation so that a criterion is met, the criterion being met at least if the energy balance of the installation is positive for a given length of time.

BRIEF DESCRIPTION OF THE DRAWINGS

Other features and advantages of the invention will appear upon reading the following description of embodiments of the invention, solely as an example and done in reference to the drawings, which are.

DETAILED DESCRIPTION OF THE PREFERRED EMBODIMENTS

Figure 1:
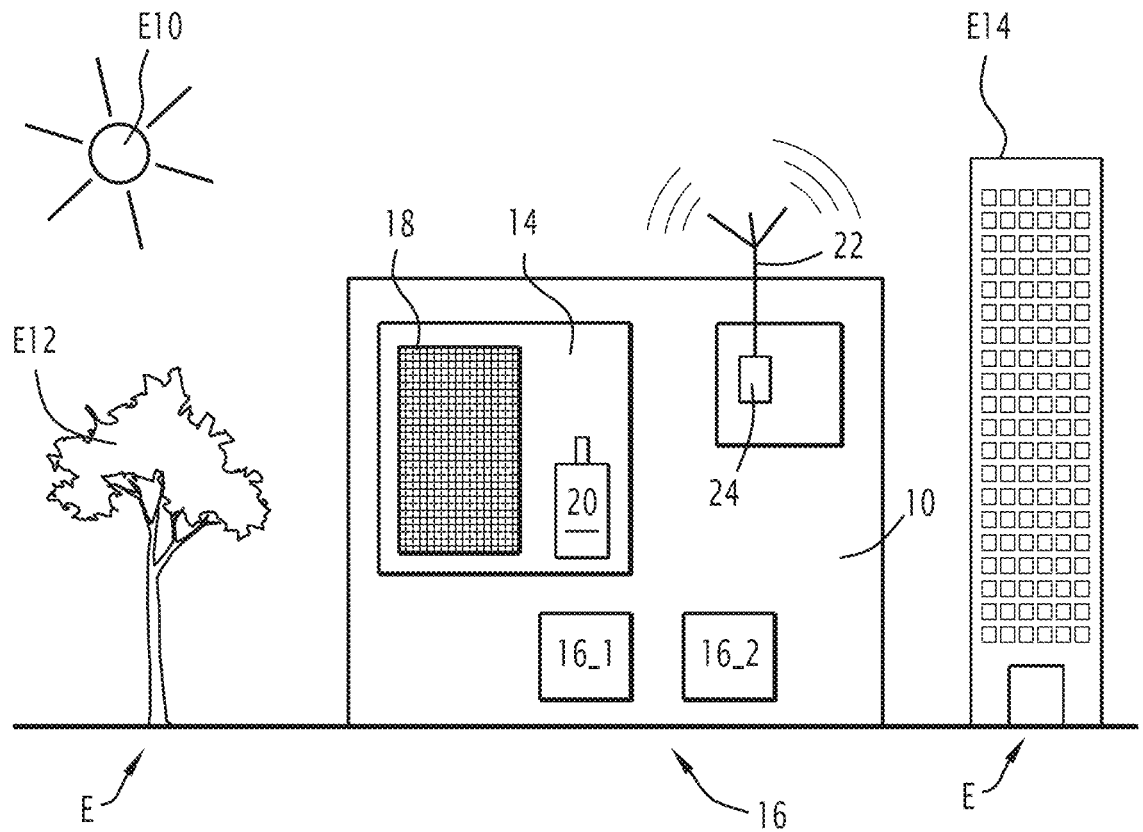
FIG. 1, a diagrammatic view of an example installation.

An installation 10 and a management system 12 are shown diagrammatically in FIG. 1.

The installation 10 depends on the considered applications. In general, the installation provides a user with one or more services.

For example, the installation 10 is a house.

Preferably, in the illustrated case, the installation 10 is an automaton.

"Automaton" refers to a multiservice electromechanical device intended for users of urban areas. For example, an automaton is a piece of equipment for managing parking and public transportation ticketing for individuals. The term "automaton" in particular targets an automaton in the parking and individual transportation field.

A timestamping device is one particular example of an automaton. As shown in FIG. 1, the installation 10 includes the management system 12.

According to the example of FIG. 1, the management system 12 is a controller.

The management system 12 is a system making it possible to manage the operation of the installation 10. To that end, the management system 12 is in particular able to carry out a management method of the installation 10.

The installation 10 includes a power supply device 14 and a plurality of members 16.

The power supply device 14 includes a photovoltaic system and a storage unit 20.

According to the example of FIG. 1, the photovoltaic system comprises a single solar panel 18.

Alternatively, the photovoltaic system includes a plurality of solar panels 18.

In the case of FIG. 1, the solar panel 18 is positioned so as to capture the solar flow emitted by the environment E.

If the installation 10 is an automaton, the environment E is usually an urban environment, for example with trees and buildings that may hinder access by the solar panel 18 to the irradiance, and in particular the solar flow. As a result, as an illustration, in this FIG. 1, the environment E includes the sun E10, a tree E12 and a skyscraper E14.

The storage unit 20 is able to store the energy produced by the solar panel 18.

For example, the storage unit 20 is a set of batteries. A single battery is shown in FIG. 1.

According to the example of FIG. 1, the power supply device 14 is a so-called photovoltaic power supply device because the power supply device 14 includes a solar panel 18.

Alternatively, the power supply device 14 is mixed.

"Mixed" means that the power supply device 14 includes a power supply part of the photovoltaic type and an additional energy contribution part. The additional energy contribution part is able to contribute energy not coming from the solar panel 18.

According to one particular embodiment, the additional energy contribution part is inside the installation 10.

For example, the additional energy contribution part is a non-rechargeable battery.

According to another embodiment, the additional energy contribution part is a part for receiving energy produced outside the power supply device 14.

As an example, the part for receiving energy produced outside the power supply device 14 is connected to the outside electrical grid. The part for receiving energy produced outside the power supply device 14 makes it possible to complete the power produced by the solar panel 18.

Such a mixed power supply device 14 is in particular favored when the sunshine received by the solar panel 18 is insufficient to meet the energy needs of the installation 10.

In the illustrated example, only two members 16 are shown, given that there may a priori be any number of members.

For the case of an automaton, the installation 10 includes at least five members.

As shown in FIG. 1, the reference sign of the first member is 16_1 and the reference sign of the second member is 16_2.

In general, "organ 16" refers to an organ contributing to providing one or more services for a user of the installation 10.

"Contributing to providing" must be interpreted broadly, in particular as comprising cases of "dematerialized" services that simply make the service(s) in question available.

Consequently, such a member consumes energy to operate. In other words, each member 16 consumes energy produced by the power supply device 14.

If the installation 10 is a house, the members 16_1 and 16_2 are for example household appliances. In particular, the first member 16_1 is a dishwasher, while the second member 16_2 is a refrigerator.

If the installation 10 is an automaton, the members 16 are for example a member providing a ticket, a member reading a payment card, a member reading inserted tickets, a display device or a data transmission member.

In the rest of this document, the first member 16_1 is a member for inserting a confidential code.

The second member 16_2 is a display device. According to one particular embodiment, the device is a screen.

The second member 16_2 is able to operate using several operating modes.

In a first embodiment, the second member 16_2 only displays information allowing the user to interact with the other members 16 of the installation 10.

In a second embodiment, the second member 16_2 displays both information allowing the user to interact with the other members 16 of the installation 10 and information that may be of interest to the user. Among the information that may be of interest to the user, the users attention is drawn to cultural events taking place near the installation 10 or information relative to the company managing the installation 10.

The second member 16_2 consumes more energy in the second operating mode than in the first.

In general, according to one embodiment, each operating mode causes a different energy consumption.

The management system 12 includes an antenna 22 and a determining unit 24.

The antenna 22 is able to communicate with the outside.

For example, the antenna 22 allows the management system 12 to access information contained in the server, for example by a radio link.

The determining unit 24 is able to determine the available energy coming from the power supply device 14.

The determining unit 24 is also able to determine the energy consumed by each of the members 16. In particular, the determining unit is able to determine the energy consumed by the first member 16_1 and the energy consumed by the second member 162.

The operation of the installation 10 and the management system 12 is now illustrated in reference to the implementation of a method for managing the operation of the installation 10.

The management method includes a plurality of steps: a first step a) for choosing, a second step b) for determining the available energy, a third step c) for determining the consumed energy and a fourth step d) for optimization.

The first step a) for choosing is implemented by an interaction between the management system 12 and the user of the method.

The user specifies the number of parameters to be taken into account in the following steps of the method.

According to one preferred embodiment, the number of parameters is less than or equal to 7, preferably less than or equal to 5, and preferably less than or equal to 3.

The parameters chosen in the choosing step a) are chosen from among relevant parameters.

Each parameter makes it possible to quantify the available energy for the power supply device 14.

In particular, the parameters make it possible to determine the energy contribution of the solar panel 18.

The parameters are chosen from a group consisting of parameters representative of the time period and parameters representative of the solar panel 18.

A parameter representative of the time period is for example the month of the year or the season. Indeed, the period of the year determines the sunshine related to the sun E10. The sun E10 illuminates the solar panel 18 more in the summer than in the winter.

A parameter representative of the technical characteristics of the solar panel 18 is, for example, geometric size or position characteristics of the solar panel 18.

In more elaborate embodiments, parameters related to the environment are also taken into account.

According to one example, the following parameters are considered: the annual radiant exposure, the temperature, the geographical coordinates of the installation, the time zone, the incline of the solar panel 18, the orientation of the solar panel 18, the efficiency of solar panel 18 and the performance of the storage unit 20.

In one particular case, it is the person who will adjust the management system 12 during the installation of the management system on the installation 10 who carries out step a). In general, in this context, the term "installation" designates the phase preceding commissioning without indicating time limits.

Advantageously, in such a case, the first step a) is only carried out during commissioning of the management system 12. In such a case, the number of parameters is predetermined.

At the end of the choosing step a), the number of parameters to be taken into account as well as the desired parameters are known and are communicated to the determining unit 24.

During the second determining step b), the available energy coming from the power supply device 14 is determined taking account of the parameters selected in the choosing step a).

In the proposed embodiment, the step b) for determining available energy is carried out by the management system 12 itself via the determining unit 24.

The energy determining step b) includes several sub-steps.

During a first sub-step b1), an image of the environment E is provided. In the particular case of FIG. 1, the environment E comprises three elements, i.e., the sun E10, the tree E12 and the skyscraper E14.

To that end, a 360° shot is taken for the installation 10. The shot is for example obtained using an image sensor.

Alternatively, the image is provided and obtained using the antenna 22 on a remote server.

At the end of the first sub-step b1), an image of the environment E is obtained.

During a second sub-step b2), the image obtained during the first sub-step b1) is processed to determine the elevation of each obstacle relative to the solar panel 18.

For example, the tree E12 constitutes an obstacle having a lower elevation than the skyscraper E14. As a result, the tree E12 is less bothersome than the skyscraper E14 regarding access to light from the sun E10.

The entire map containing the elevation of each obstacle relative to the solar panel 18 is typically called an elevation mask.

At the end of the second sub-step b2), an elevation mask is thus obtained for the environment E.

The second determining step b) includes a third sub-step b3) for computing the produced energy from the elevation mask and other parameters selected by the user in the first step b).

Alternatively, the produced energy is provided outwardly to the management system 12. In such an alternative, the antenna 22 communicates with a server, then provides the collected data to the determining unit 24.

The second determining step b) also comprises a fourth sub-step b4) for determining the energy stored by the power supply device 14.

The second determining step b) lastly includes a fifth sub-step for computing the available energy coming from the power supply device 14. To that end, the sum of the energy produced by the power supply device 14 and the energy stored by the power supply device 14 is obtained.

According to another alternative, the step b) for determining available energy only includes the third sub-step b3), the elevation mask being obtained owing to the antenna 22 from data available online.

At the end of the second step b2) for supplying the produced energy, the available produced energy coming from the power supply device 14 and therefore available for the installation 10 is known.

During the third step c), the energy consumed by each of the members 16_1 and 16_2 is determined using the determining unit 24.

For example, in the case of the first member 16_1, the determination of the consumed energy is computed from the energy involved in an operation and the number of operations having taken place on average on the installation 10.

Alternatively, the value of the consumed energy is provided by a remote server.

Optionally, the consumption of the members 16 is provided for each of the operating modes of the member 16. As an example, the energy consumption of the second member 16_2 is provided both in the first operating mode and in the second operating mode.

At the end of the third step c) for determining the energy consumption, the consumption of each of the members 16 is known by the management system 12.

During the fourth optimization step d), the operation of the installation 10 is adjusted so that a predetermined criterion C is met.

Alternatively, instead of adjusting the operation of the installation 10, information is sent to the operator, in particular to anticipate maintenance operations. For example, a piece of information indicates the intervention time to change a battery of the storage member 20.

According to another alternative, information is sent to the user. For example, a piece of information indicates the status of the installation 10.

In the context of this invention, operation refers to the number of members 16 that are operational as well as their operating modes.

In the described case, there are six operating modes for the installation 10 illustrated in FIG. 1:

1. the first member 16_1 and the second member 16_2 are nonoperational (the energy consumption is then zero), 2. the first member 16_1 is operational and the second member 16_2 is not operational,
3. the first member 16_1 is operational and the second member 16_2 is operating according to the first operating mode,
4. the first member 16_1 is operational and the second member 16_2 is operating according to the second operating mode,
5. the first member 16_1 is nonoperational and the second member 16_2 is operating according to the first operating mode, and
6. the first member 16_1 is nonoperational and the second member 16_2 is operating according to the second operating mode.

The predetermined criterion C requires that the energy balance of the installation 10 be greater than or equal to 0 during a given length of operating time of the installation 10.

The energy balance of the installation 10 is defined simply as being the difference between the available energy coming from the power supply device 14 and the energy consumed by the various members 16. The available energy coming from the power supply device 14 is the sum of the energy produced by the power supply device 14 and the energy stored in the power supply device 14.

The given time generally corresponds to a usage time of the installation 10. For example, the given time is 8 hours.

According to another depiction, the given time is expressed in terms of operations.

Advantageously, the criterion C is more complex and assumes that other conditions are met. As an example, it is required that a particular member 16 be operating to ensure that the installation 10 is useful to the user.

According to another example, compliance with the criterion C requires that the evolution of the energy balance of the installation 10 comply with a predictive model determined using information from steps a, b and c.

The method therefore makes it possible to estimate the influence of the environment Eon the energy production of the installation 10. According to the illustrated example, masks are used showing the elevation of the surrounding obstacles to determine such an influence.

The method also makes it possible to predict the autonomy and the autonomy levels, which constitutes a major indication for the efficient operation of the machine in the field. This is in particular obtained by computing the maximum number of operations that the installation 10 can perform daily to guarantee its energy autonomy.

The management method makes it possible to adjust the energy consumption of an installation to guarantee its autonomy. This results in improved service.

Figure 2:
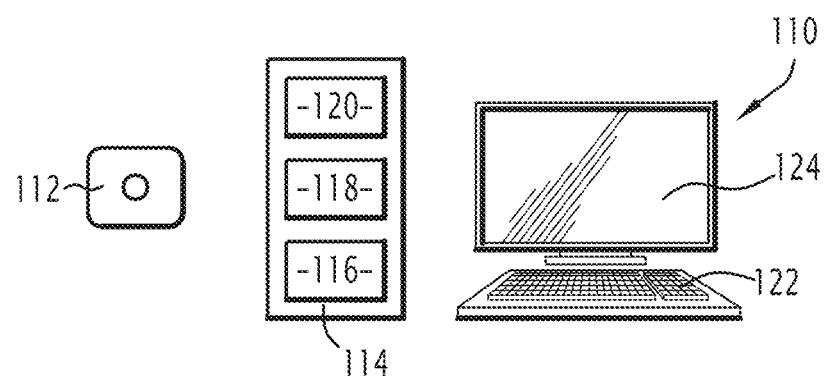
FIG. 2, a diagrammatic view of an example management system.

Alternatively, as diagrammatically illustrated by FIG. 2, the management system 110 is outside the installation 10.

To that end, a management system 110 and a computer program product 112 are proposed, as shown in FIG. 2. The interaction of the computer program product 112 with the management system 110 makes it possible to carry out the management method of the installation 10.

In this case, the management system 110 is a computer.

More generally, the management system 110 is an electronic computer able to manipulate and/or transform data represented as electronic or physical quantities in registers of the system 110 and/or memories or other similar data corresponding to physical data in the memories, registers or other display, transmission or storage devices.

The management system 110 includes a processor 114 comprising a data processing unit 116, memories 118 and an information medium reader 120. The management system 110 comprises a keyboard 122 and a display unit 124.

The computer program product 112 includes a readable information medium. The readable information medium is a medium readable by the system 110, usually by the data processing unit 116. The readable information medium is a medium suitable for storing electronic instructions and able to be coupled with a bus of a computer system.

As an example, the readable information medium is a floppy disk, an optical disc, a CD-ROM, a magnetic-optical disc, a ROM memory, a RAM memory, an EPROM memory, an EEPROM memory, a magnetic card or an optical card.

A computer program including program instructions is stored on the readable information medium.

The computer program can be loaded on the data processing unit 114 and is suitable for driving the implementation of the method for managing the installation 10 when the computer program is implemented by the processing unit 116.

Each of the proposed methods can be implemented using any computer or any other type of device. Multiple systems can be used with programs carrying out the preceding methods, and it is also possible to consider using devices dedicated to carrying out the preceding methods, which may be inserted in the devices able to measure the supplied data. In particular, according to one particular case, the management system 12 includes the antenna 22, a determining unit and a control unit. In this case, the determining unit is able to determine the energy balance and the control unit is able to manage the installation 10 based on the energy balance.

Furthermore, the proposed embodiments are not tied to a particular programming language. Incidentally, this means that multiple programming languages can be used to carry out one of the methods previously outlined.

The methods and embodiments described above may be combined with one another, in whole or in part, to create other embodiments of the invention.

The invention claimed is:

1. A method for managing an installation, the installation including a power supply device, and members supplied with energy by the power supply device, the method comprising:
    determining an available energy coming from the power supply device;
    determining the energy consumed by the members, each of the members comprising an operational state and a non-operational state;
    selecting one of a plurality of operating modes of the installation corresponding to a combination of members that are in the operational state and the non-operational state, each operating mode being distinct from each other operating mode, the selecting occurring by using a criterion so that at least an energy balance of the installation is positive for a given length of time; and
    operating the installation according to the selected operating mode of the installation.

2. The management method according to claim 1, wherein the installation is an automaton.

3. The management method according to claim 1, wherein the determining the available energy coming from the power supply device includes:
    providing an image of the environment of at least part of the installation, processing the provided image, computing the energy produced by the power supply device, determining the energy stored by the power supply device, and computing the available energy coming from the power supply device by obtaining the sum of the energy produced by the power supply device and the energy stored by the power supply device.

4. The management method according to claim 1, wherein in the determining the consumed energy, the consumed energy is expressed in terms of operations.

5. The management method according to claim 1, further comprising choosing parameters taken into account to determine the energy produced by the power supply device, wherein the number of parameters taken into account is less than or equal to 7, or the parameters taken into account comprise the geometry of the power supply device, the output of the power supply device, and the sunshine produced by the sun.

6. The management method according to claim 1, wherein at least one of the members is configured to operate according to several operating modes in the operational state, each operating mode causing a different energy consumption, and, during the optimizing, the number of members that are operational and the operating modes of the members are optimized so that the energy balance of the installation is positive for the given length of time.

7. The management method according to claim 1, further comprising sending information representative of the selected operating mode of the installation to an operator to anticipate maintenance operations, or to a user of the installation.

8. The management method according to claim 1, wherein, during the selecting, the state of at least one of the members is the operational state.

9. The management method according to claim 1, wherein the selecting is performed using the criterion so that at least that the energy balance of the installation is positive for a given length of time and so that an evolution of the energy balance of the installation complies with a predictive model determined from the determined available energy coming from the power supply device and the determined energy consumed by the members.

10. A data medium including the instructions for a computer program product including a readable information medium, on which a computer program is stored comprising program instructions, the computer program being able to be loaded on a data processing unit and configured to drive, when the computer program is implemented on the data processing unit, the implementation of a method for managing an installation including a power supply device, and members supplied with energy by the power supply device, the method comprising:

determining an available energy coming from the power supply device;

determining the energy consumed by the members, each of the members comprising an operational state and a non-operational state;

optimizing an operation of the installation so that a criterion is met, the criterion being met at least when an energy balance of the installation is positive for a given length of time, the number of members that are in the operational state being optimized during the optimizing; and operating the members according to the optimized operation of the installation.

11. A management system configured to manage an installation including a power supply device, and members supplied with energy by the power supply device, wherein the management system determines an available energy coming from the power supply device, determines the energy consumed by the members, each of the members comprising an operational state and a non-operational state, and optimizes an operation of the installation at so that a criterion is met, the criterion being met at least when an energy balance of the installation is positive for a given length of time, the number of members that are in the operational state being optimized during the optimizing, and operating the members according to the optimized operation of the installation.

12. A method for managing an installation including a power supply device, and members supplied with energy by the power supply device, the method comprising:

determining an available energy coming from the power supply device;

determining the energy consumed by the members, each of the members comprising an operational state and a non-operational state;

optimizing an operation of the installation so that a criterion is met, the criterion being met at least when an energy balance of the installation is positive for a given length of time; and operating the members according to the optimized operation of the installation, wherein the number of members that are in the operational state are optimized during the optimizing.

13. A method for managing an installation including a power supply device, and members supplied with energy by the power supply device, the method comprising:

determining an available energy coming from the power supply device;

determining the energy consumed by the members, each of the members comprising an operational state and a non-operational state;

optimizing an operation of the installation so that a criterion is met, the criterion being met at least when an energy balance of the installation is positive for a given length of time, the number of members that are in the operational state being optimized during the optimizing;

operating the members according to the optimized operation of the installation; and sending information representative of the optimized operation of the installation to an operator to anticipate maintenance operations, or to a user of the installation.

14. An automaton including a management system configured to manage the automaton, the automaton comprising:

a power supply device including a photovoltaic system comprising at least one solar panel; and members supplied with energy by the power supply device, each of the members comprises an operational state and a non-operational state, wherein the management system determines an available energy coming from the power supply device, determines the energy consumed by the members, optimizes an operation of the automaton so that a criterion is met, the criterion being met at least when an energy balance of the automaton is positive for a given length of time, the number of members that are in the operational state being optimized during the optimizing, and operates the members according to the optimized operation of the installation.

* * * * *